(12) United States Patent
Yun et al.

(10) Patent No.: US 11,051,058 B2
(45) Date of Patent: Jun. 29, 2021

(54) REAL-TIME WIRELESS VIDEO DELIVERY SYSTEM USING A MULTI-CHANNEL COMMUNICATIONS LINK

(71) Applicant: HEWLETT PACKARD ENTERPRISE DEVELOPMENT LP, Houston, TX (US)

(72) Inventors: Sangki Yun, Palo Alto, CA (US); Kyu Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 6 days.

(21) Appl. No.: 16/139,430

(22) Filed: Sep. 24, 2018

(65) Prior Publication Data
US 2020/0099965 A1    Mar. 26, 2020

(51) Int. Cl.
| | |
|---|---|
| H04N 21/235 | (2011.01) |
| H04N 21/2343 | (2011.01) |
| H04N 19/70 | (2014.01) |
| H04N 19/46 | (2014.01) |
| H04N 21/435 | (2011.01) |
| H04N 9/78 | (2006.01) |
| H04N 19/186 | (2014.01) |

(52) U.S. Cl.
CPC ......... *H04N 21/2356* (2013.01); *H04N 19/46* (2014.11); *H04N 19/70* (2014.11); *H04N 21/234363* (2013.01); *H04N 21/435* (2013.01); *H04N 9/78* (2013.01); *H04N 19/186* (2014.11)

(58) Field of Classification Search
CPC .... H04N 21/2356; H04N 19/46; H04N 19/70; H04N 21/234363; H04N 21/435; H04N 19/186; H04N 9/78
USPC .......................................................... 709/247
See application file for complete search history.

(56) References Cited

U.S. PATENT DOCUMENTS

| | | | |
|---|---|---|---|
| 9,572,079 B2 | 2/2017 | Somayazulu et al. | |
| 2008/0069203 A1* | 3/2008 | Karczewicz | G06T 3/4007 375/240.01 |
| 2010/0166063 A1* | 7/2010 | Perlman | A63F 13/355 375/240.07 |
| 2011/0043407 A1* | 2/2011 | Moshfeghi | G01C 21/20 342/394 |

(Continued)

FOREIGN PATENT DOCUMENTS

CN    106162267 A    11/2016

OTHER PUBLICATIONS

Sur, S. et al., "WiFi-Assisted 60 GHz Wireless Networks," Oct. 16-20, 2017, http://xyzhang.ucsd.edu/papers/SSur_MobiCom17_MUST.pdf.

(Continued)

*Primary Examiner* — Hamza N Algibhah
*Assistant Examiner* — Tony Williams
(74) *Attorney, Agent, or Firm* — Nolte Lackenbach Siegel (57) ABSTRACT

A system described herein provides real-time wireless video delivery using a multi-channel communications link. A method of employing elements of the system includes generating a first set of video data and generating a second set of video data. Further, encoding the first set of video data such that the second set of video data is a higher resolution version of the first set of video data and the encoded first set of video data is to supplement the second set of video data in response to a data drop.

18 Claims, 8 Drawing Sheets

(56) References Cited

U.S. PATENT DOCUMENTS

| | | | |
|---|---|---|---|
| 2011/0221860 A1* | 9/2011 | Rideout | H04N 19/172 |
| | | | 348/14.09 |
| 2012/0002103 A1 | 1/2012 | Shao et al. | |
| 2012/0142429 A1* | 6/2012 | Muller | A63F 13/45 |
| | | | 463/42 |
| 2015/0012708 A1* | 1/2015 | Rubinstein | H04N 19/105 |
| | | | 711/125 |
| 2016/0014840 A1* | 1/2016 | Kimmich | H04N 19/61 |
| | | | 370/329 |
| 2017/0295372 A1* | 10/2017 | Lawrence | H04N 19/182 |
| 2017/0358141 A1* | 12/2017 | Stafford | G06F 3/011 |
| 2018/0020480 A1* | 1/2018 | Yang | H04W 74/0816 |
| 2018/0176843 A1 | 6/2018 | Sankaranarayan et al. | |

OTHER PUBLICATIONS

Yang, L., "60GHz: Opportunity for Gigabit WPAN and WLAN Convergence," Jan. 1, 2009, pp. 56-61, https://dl.acm.org/citation.cfm?id=1496101.

"WirelessHD Specification Version 1.1 Overview", Overview of WirelessHD Specification Version 1.1D1, 2010, 95 pages.

Alliance, Wi-Fi. "Wi-Fi Certified Miracast™: Extending the Wi-Fi experience to seamless video display." Internet Citation (2012): 1-18.

WHDI, "Wireless Home Digital Interface", avaiable online at <https://webarchive.org/web/20170605120424/http://www.whdi.org/>, Jun. 5, 2017, 3 pages.

* cited by examiner

REAL-TIME WIRELESS VIDEO DELIVERY SYSTEM USING A MULTI-CHANNEL COMMUNICATIONS LINK

BACKGROUND

Due to recent advancements in technology, wireless channel capacities have significantly expanded, where new standard technologies enable real-time uncompressed wireless video delivery. High-quality augmented reality (A/R) and virtual reality (V/R) applications demand excessive computing power which exceeds the present processing capability of standard AR/VR peripheral devices. Therefore, many AR/VR devices offload computing tasks to dedicated computing machines.

To enable video delivery wirelessly, a Wireless High Definition Multimedia Interface (WHDMI) communications protocol has been employed. WHDMI allows the delivery of HD-quality video along a 5 GHz Wi-Fi network channel. Similarly, WirelessHD (also referred to as UltraGig) defines a wireless standard for uncompressed video delivery using an 802.11ad 60 GHz mmWave interface. Particularly, 5 GHz Wi-Fi and 60 GHz mmWave network channels are purposed to replace HDMI cables and these wireless network spectrums can be used to deliver uncompressed video frames rather than encoded video frames. Ideally, uncompressed video frames are suitable for interactive applications such as AR/VR and remote video gaming. In practice, wireless channel capacity depends on signal propagation distance, multi-path fading, and user mobility.

Generally, the quality associated with 60 GHz mmWave channel quality is affected by the distance between host and client devices. Moreover, the quality associated with 5 GHz Wi-Fi network channels is relatively lower than the 60 GHz mmWave spectrum because the relative crowding of the 5 GHz network spectrum. Given the tight bandwidth demands of uncompressed video delivery in 5 GHz channel, even a slight reduction in channel capacity can significantly degrade video quality. As such, the existing standards do not guarantee raw video delivery reliably.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

DETAILED DESCRIPTION

The description of the different advantageous implementations has been presented for purposes of illustration and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

Before the present disclosure is described in detail, it is to be understood that, unless otherwise indicated, this disclosure is not limited to specific procedures or articles, whether described or not. It is further to be understood that the terminology used herein is for the purpose of describing particular implementations only and is not intended to limit the scope of the present disclosure.

It must be noted that as used herein, and in the claims, the singular forms "a," and "the" include plural referents unless the context clearly dictates otherwise.

As many AR/VR devices offload computing tasks to dedicated computing machines, there have been challenges to effectively connect these dedicated computing machines with AR/VR peripheral devices without creating significant bottlenecks in data transmission, particularly video frames.

Examples of the present disclosure are directed to a wireless video delivery technique that exploits multiple network spectrums. Notably, examples of the present disclosure exploit the advantageous characteristics of two or more network channels. In one implementation, a 5 GHz Wi-Fi channel and a 60 GHz millimeter-Wave (mmWave) channel delivers video content across a network. Used herein, a mmWave or millimeter wave spectrum is a network band of spectrum between 30 GHz and 300 GHz. In particular, a mmWave spectrum can be used for high-speed wireless communications as seen with the 802.11ad Wi-Fi standard (operating at 60 GHz).

The multi-channel transmission technique described herein delivers critical and compressed video data on one network channel and raw video data on another network channel. In addition, one of the network channels can deliver low-resolution video data relative to the high-resolution video data transmitted on another network channel. In an event that there is a data drop along the network channel which transmits the high-resolution video data, a video data stream associated therewith can be supplemented with a low-resolution video data.

The bandwidth needed for uncompressed video data may be significant for AR/VR devices. The data bit-rate of the uncompressed video can be determined by computing the product of the vertical resolution, horizontal resolution, color depth, and frames per second (FPS). The data rates of a few example video formats are the following:

480 p/165 Mbps;
720 p/442 Mbps;
1080 p/995 Mbps; and
4K/3981 Gbps.

For higher resolution video formats such as 4K (e.g., approximately 3.981 Gbps bandwidth), 5 GHz Wi-Fi may be insufficient to support the entire bandwidth. However, employing network spectrums with greater bandwidth such as 60 GHz mmWave spectrum may also have limitations as 60 GHz mmWave have short wavelength signals (e.g., 5 mm) which decay quickly over short distances. Consequently, delivering high-quality raw video data in wireless network channels may be challenging in both 5 GHz Wi-Fi and 60 GHz mmWave network spectrums. 5 GHz Wi-Fi may be insufficient to provide large bandwidth to accommodate high definition (HD) video for data-intensive applications. Accordingly, examples of the present disclosure implement a multi-spectrum approach to deliver wireless video data for various high-end applications.

Figure 1:
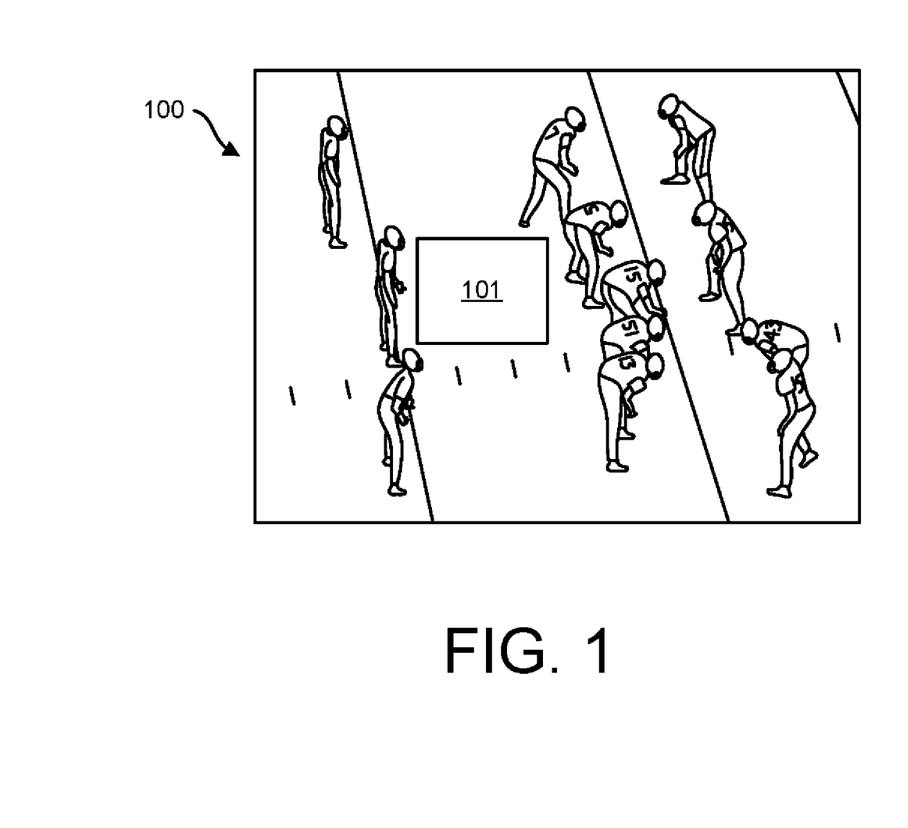
FIG. 1 is an illustration of a video frame which highlights an example of a video block.

FIG. 1 is an illustration of a video frame 100 which highlights an example of a video block 101. Video frame 100 is one of a plurality of frames associated with a video stream. The video stream may be associated with any type of media content. One having ordinary skill in the art may appreciate that the present disclosure is not limited to video data transmission but may include any media content so long as it does not depart from the spirit and scope of the present disclosure.

Used herein, a video frame may comprise a plurality of pixels. The video frame 100 may be configured in any format known in the art. For example, video frame 100 may be formatted as 480 p, 720 p, 1080 p, or 4K video format.

A real-time wireless video delivery system disclosed herein implements a multi-channel video data transmission scheme which transmits raw video data across a high-bandwidth network spectrum and a processed video data across a low-bandwidth network spectrum. Herein, raw video data is defined as discrete pixel data generated by a hardware device or software application which does not undergo further processing. For example, for video data formatted in 1080 p, the raw video data includes color values associated with each of the 2,073,600 pixels of a single video frame. As raw video data is associated with high-resolution video data transmitted on a high-bandwidth network such as 60 GHz mmWave, drops may occur as the bandwidth capacity is directly affected by the distance that a transmitter is from its paired receiver.

Accordingly, a receiving device of the frames can readily determine whether a data drop has occurred in a data stream. For example, if a next frame received has a frame ID that is not expected (e.g., skipped frame ID) and the missing frame is not received within a pre-determined time period, the missing frame can be considered dropped.

Processed video data may refer to pixel data within a block of pixels which has color values that are the same or substantially close to the color values associated with the other pixels within the block. As will be described in more detail below, as this technique presumes that each pixel within the block will have the same or substantially the same color values associated therewith and therefore approximate values may be assigned to pixel color values when this is not the case. This encoding scheme is implemented to decrease the bandwidth needed to transmit the video data as will be described herein. As such, if a color value associated with a pixel is substantially greater or smaller than the average color value associated with the entire block, the color values associated with the pixel may be assigned a "maximum" value such that the maximum bit values available to represent the difference will not be exceeded.

For example, if a block of pixels includes sixteen pixels of which fifteen pixels have a yellow color (including various shades of yellow) but one of the pixels is orange, the color value associated with the orange pixel may be assigned the color value of a shade of yellow that is the closest to orange but whose digital representation does not necessitate more bits than needed to represent the difference between the orange color value and the average color value of the sixteen pixels in the respective block as further explained below.

Figure 2:
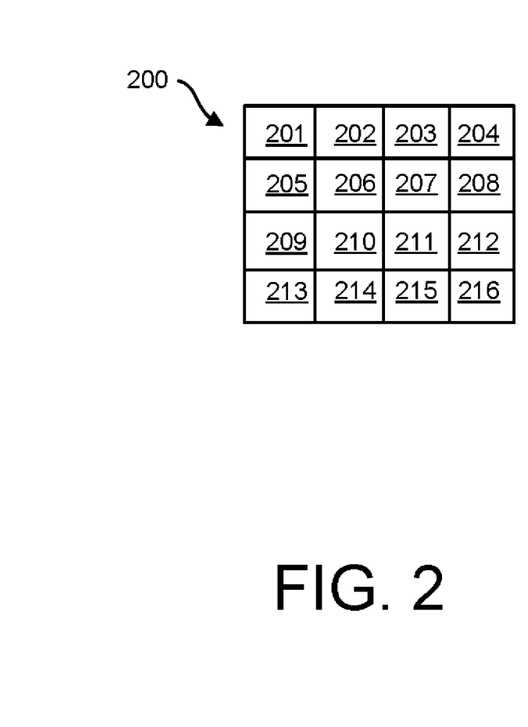
FIG. 2 is an illustration of the video block of FIG. 1 represented as a block of pixels.

FIG. 2 is an illustration of the video block displayed in FIG. 1 (e.g., block 101 of FIG. 1) represented as a block 200 of pixels. In particular, block 200 of pixels are the color values associated with the block 101 portion of video frame 100 illustrated in FIG. 1. Dividing a video frame into blocks of pixels is included in a process of sending low-resolution video data to a client device. The example block 200 of pixels 201-216 comprise sixteen pixels. Also shown in the figure, the sixteen pixels 201-216 of block 200 are configured as a 4×4 block of pixels. Notably, each of the pixels 201-216 share the same or substantially the same color as illustrated in FIG. 2.

One having ordinary skill in the art may appreciate that the block 200 of pixels is not limited to sixteen pixels. The block 200 of pixels may comprise any number of pixels so long as the number of pixels per block does not depart from the spirit and scope of the present disclosure. The color value(s) associated with each pixel per block is typically the same or substantially similar. In one implementation of the present disclosure, the color value(s) associated with each pixel per block 200 is within one standard deviation of the other pixels within the block 200. For example, if the color associated with the entire block 200 is red, the colors associated with the other pixels in the block may be red or a different shade of red.

Figure 3:
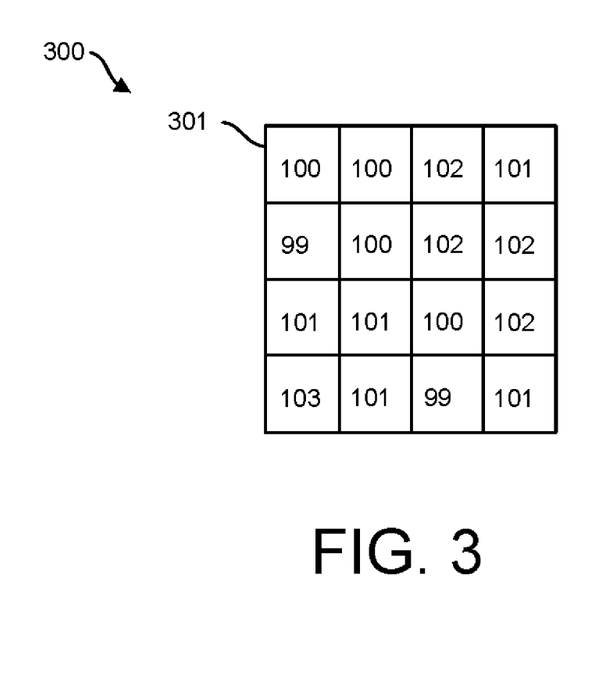
FIG. 3 is a block of color values associated with the block of pixels illustrated in FIG. 2.

FIG. 3 is a block 300 of color values associated with the block of pixels illustrated in FIG. 2. In the implementation shown, block 300 includes sixteen color values. These color values may correspond to any color classification system. For instance, an example of a color classification system employed by the present disclosure is a YUV color space. As shown by one having ordinary skill in the art, a YUV color space is associated with three color values per pixel. In particular, a YUV color space includes a single luminance (Y) value and two chrominance (U and V) color values. In the example implementation shown in FIG. 3, the sixteen color values in block 300 represent luminance (Y) color values.

The color value(s) associated with each pixel have YUV components for luminance and chrominance. In addition, each data frame associated with each pixel includes eight bits of data. The eight bits of data may comprise three bits of data for the computed color difference between the luminance (Y) component for a selected pixel and that of the entire block, one bit of data for the sign of the computed color difference of the luminance (Y) component, two bits of data to represent the chrominance (U) component of the selected pixel, and two bits of data to represent the chrominance (V) component of the selected pixel. It should be appreciated by one having ordinary skill in the art that adjacent pixels may share the same chrominance values and therefore the amount of memory expected may be half of what is necessitated for the luminance values.

Advantageously, the color values associated with the raw video data may be encoded to reduce the number of bits needed to be represented in a data frame as described with reference to the next figure.

Figure 4:
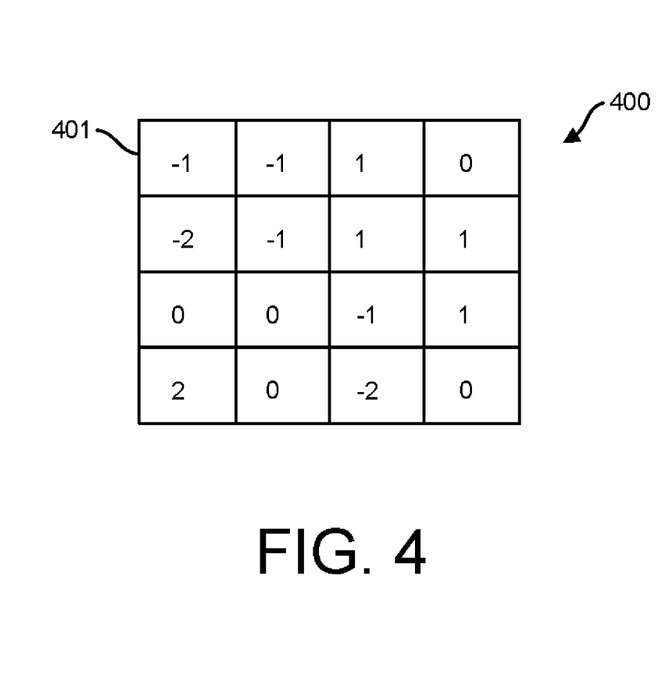
FIG. 4 is a block of encoded color values associated with the block of pixels illustrated in FIG. 2.

FIG. 4 is a block 400 of encoded color values 401 associated with the block 200 of pixels illustrated in FIG. 2. The present disclosure may employ any of various encoding schemes to reduce the bit size needed to represent the color value(s). For example, in one implementation, the average color values per block (see FIG. 3) is computed and the difference between the color values in each cell for each pixel (see FIG. 3) and the average color value for the block is computed and stored in a data frame. The values shown in block 400 reflect the color value difference between the average color value of the block 300 and the color value associated with each pixel (see FIG. 3). Accordingly, the color value associated with pixel 301 of FIG. 3 is equal to 1 (i.e., 100-101).

Figure 5A:
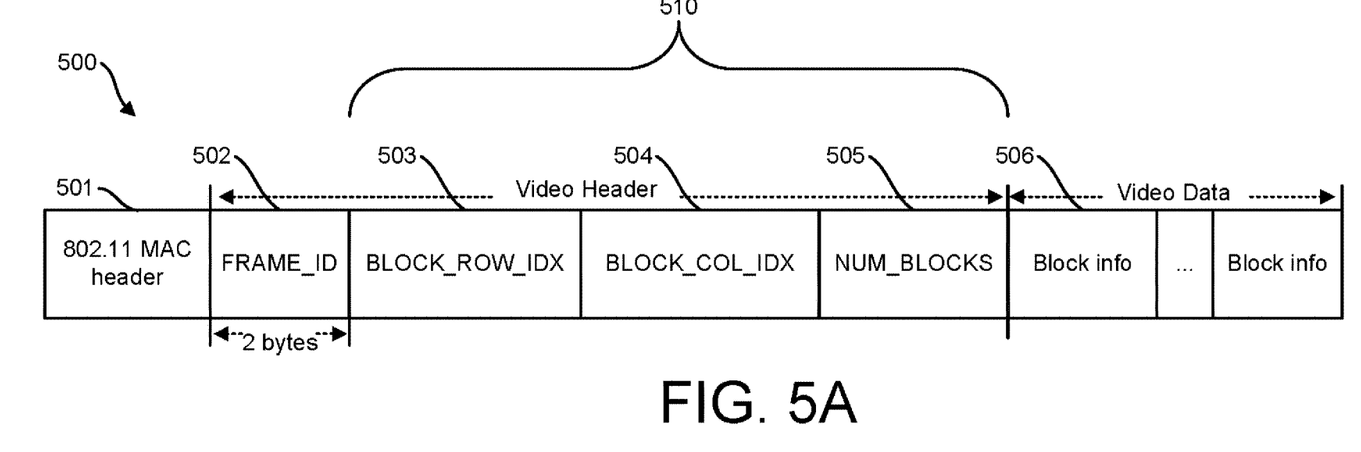
FIGS. 5A-5B illustrate an example of a video frame format according to one implementation of the present disclosure.
Figure 5B:
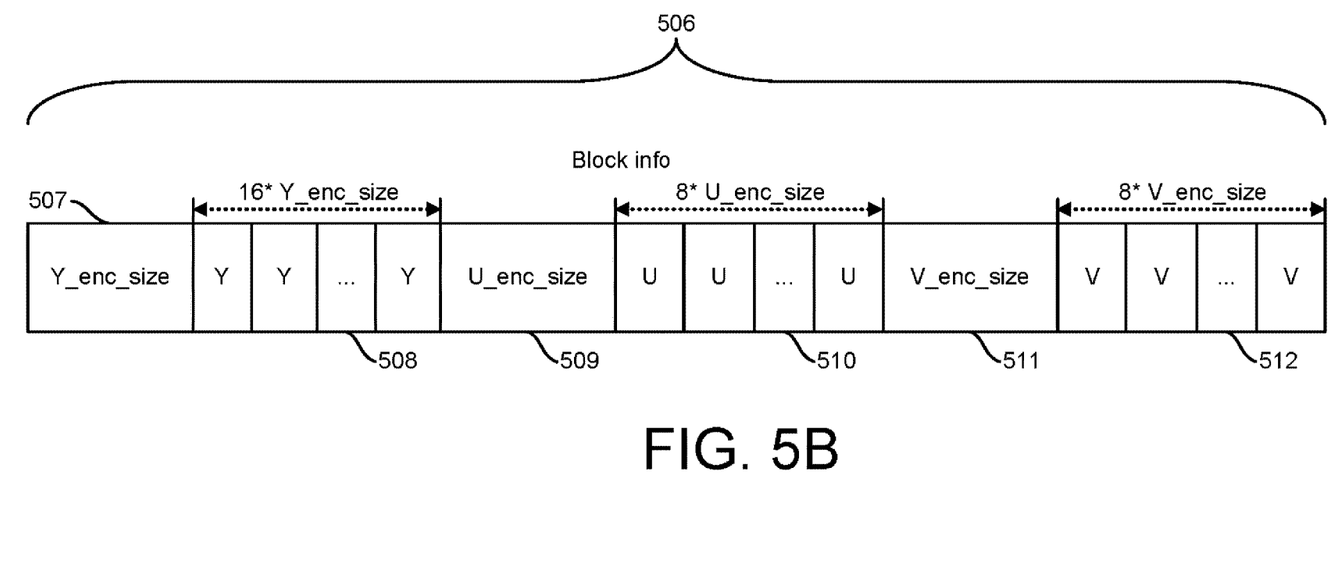

FIGS. 5A and 5B illustrate an example of a video frame format 500 according to one implementation of the present disclosure. In the implementation shown, video data frame 500 is an example format for a data frame which is used to deliver low-resolution video data to a client device. As previously discussed, the color values associated with each pixel are represented as the difference between the color values of individual pixels within the block and the average color values of the block of pixels. In one implementation, each color representation for each pixel consumes less than eight bits of data. In one implementation of the present disclosure, the number of bits needed to represent each color may be calculated as:

$$Log_2(max(B)-min(B)),$$

Where max(B) and min(B) are the maximum and the minimum values of the pixels in a block, respectively. The number of data bits for the luminance (Y) and chrominance (U, V) values for each pixel are stored in the Y_enc_size 507, U_enc_size 509, V_enc_size 511 fields (see FIG. 5B), respectively which all account for three bits of data. In some implementations, since two adjacent pixels share U and V chrominance values (within a symmetric block of pixels), each block has sixteen luminance (Y) values and eight chrominance (U and V) values. The size of each block is calculated as:

$$(3 \times 3 + Y\_enc\_size \times 16 + U\_enc\_size \times 8 + V\_enc\_size \times 8)/8 bytes.$$

Video data frame 500 contains a network protocol identifier 501 (i.e., 802.111 MAC header) to identify the network spectrum that the video data frames are transmitted on. In one implementation, the network protocol identifier 501 is represented by two bytes of data.

The format of the video data frame 500 may also include a frame ID 502. The frame ID 502 identifies the frame that the blocks of video pixel data are associated with. In one implementation, the video frames are transmitted (and are to be received) sequentially. In addition, the video data frame 500 includes a video header 510 which includes a block row ID number 503 (block_row_idx), a block column ID number (block_col_idx) 504, and the number of blocks (num_b-locks) 505 contained within the video data frame 500. In one implementation, video header 510 needs eight bytes of data. Further, the video data is contained within the data blocks 506. The format for the data blocks 506 is shown in FIG. 5B.

As shown in FIG. 5B, data block 506 includes field 507 which includes the value of the luminance (Y) enclosure size 507, the luminance (Y) value 508, the chrominance (U) enclosure size 509, the chrominance (U) value 510, the chrominance (V) enclosure size 511, and the chrominance (V) value 512. In one implementation, each data block includes three bytes of data. As such, when the data frame length is 1500 bytes, one frame can send 497 blocks (e.g., the payload size after the header is 1492 bytes which can carry up to 497 video blocks with 3 bytes/block with a video header of 8 bytes). Typically, the data blocks are transmitted in a horizontal (e.g., sequential) manner. For example, if the block_row_idx, block_column_idx, and num_blocks of a Wi-Fi video frame are 100, 100, and 497, respectively, since the number of blocks in a horizontal line is 480 (e.g., in 1080 p) and the block_row_idx and block_column_idx of the next data block is 101 and 102, respectively.

For video data formatted as 1080 p, employing the encoding scheme disclosed herein allows the delivery of video block information with a data bandwidth of 80 Mbps which is appreciably smaller than the maximum transmission rate of Wi-Fi with 2×2 MIMO and 40 MHz channel width (i.e., 400 Mbps).

Figure 6:
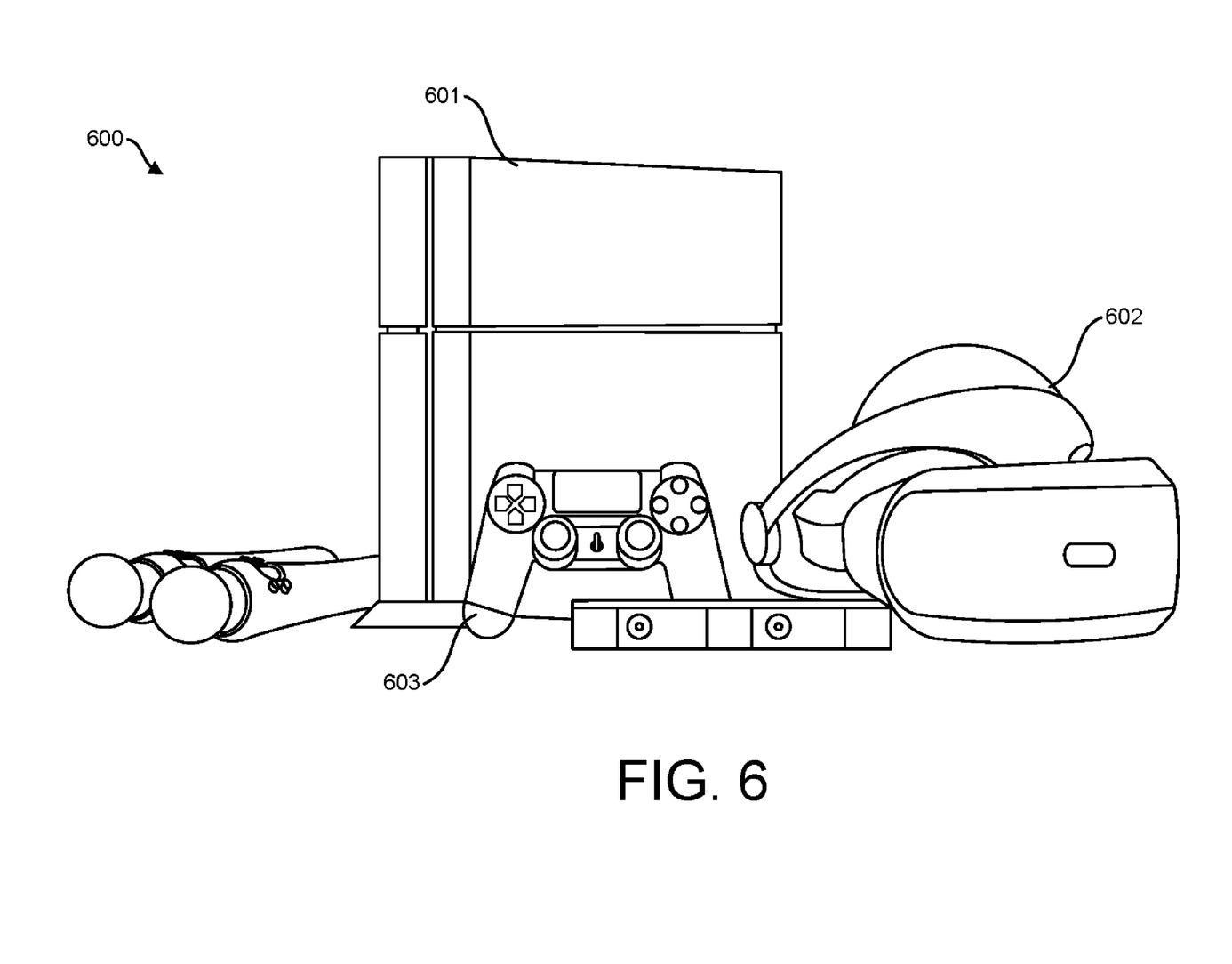
FIG. 6 is an illustration of an example of a host system, namely a gaming system according to one implementation of the present disclosure.

FIG. 6 is an illustration of an example of a host system, namely a gaming system 600 according to one implementation of the present disclosure. Accordingly, the present disclosure may be employed within a gaming system 600. Gaming system 600 includes a gaming console 601, a headset 602, a hand controller 603, and optionally other peripheral devices. As will be discussed, a gaming console 601 may include at least two radio components (e.g., transmitters) to transmit video data to the headset 602 with two radios (802.11ac/802.11ad). Likewise, headset 602 may include two receivers to receive the video data transmitted from the two transmitters of the gaming console 601.

In one implementation, the gaming console 601 creates duplicate video data streams such that one video data stream is transmitted by a first transmitter and a second video data stream is transmitted by a second transmitter. In another implementation, the host device generates video data streams that are replicated by circuits stored in the host device (e.g., gaming console 601).

Figure 7:
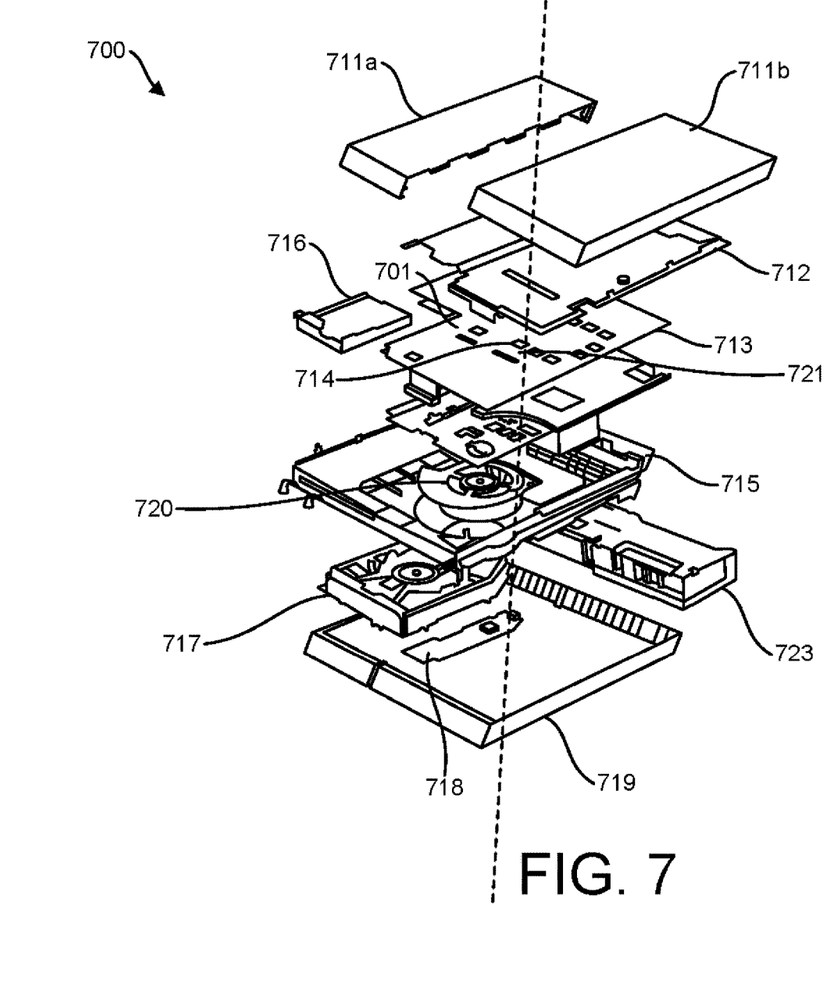
FIG. 7 is an exploded view of a gaming console according to one implementation of the present disclosure.

FIG. 7 is an exploded view of a gaming console 700 according to one implementation of the present disclosure. Gaming console 700 may include an enclosure 711, mounting rack 712, a primary printed circuit board (PCB) 713 (with several components including at least two transmitters 721), a central enclosure 715, a fan assembly 720, an optical drive 717, an optical drive controller PCB 718, a power supply 723, and a bottom enclosure 719.

In addition, gaming console 700 can contain one or more receiver devices 701. The receiver device(s) 701 can be stationed on the PCB 718. A receiver device 701 can receive signals from a client device such as a headset regarding location information. A client device can send messages to the receiver device 701 of the gaming console 700 with information regarding its distance therefrom and upon receiving this information, the receiver device 701 can send this information to the transmitters 721 to adjust the amount of data that is sent along a particular network channel. The amount of the adjustment or the amount of data that is to be sent along a network channel depends upon, or is influenced by, the distance that the headset is from the gaming console 700. In some implementations, before the request is sent, the distance between the client device and the host device must be outside of a pre-determined distance for a threshold time period.

Figure 8:
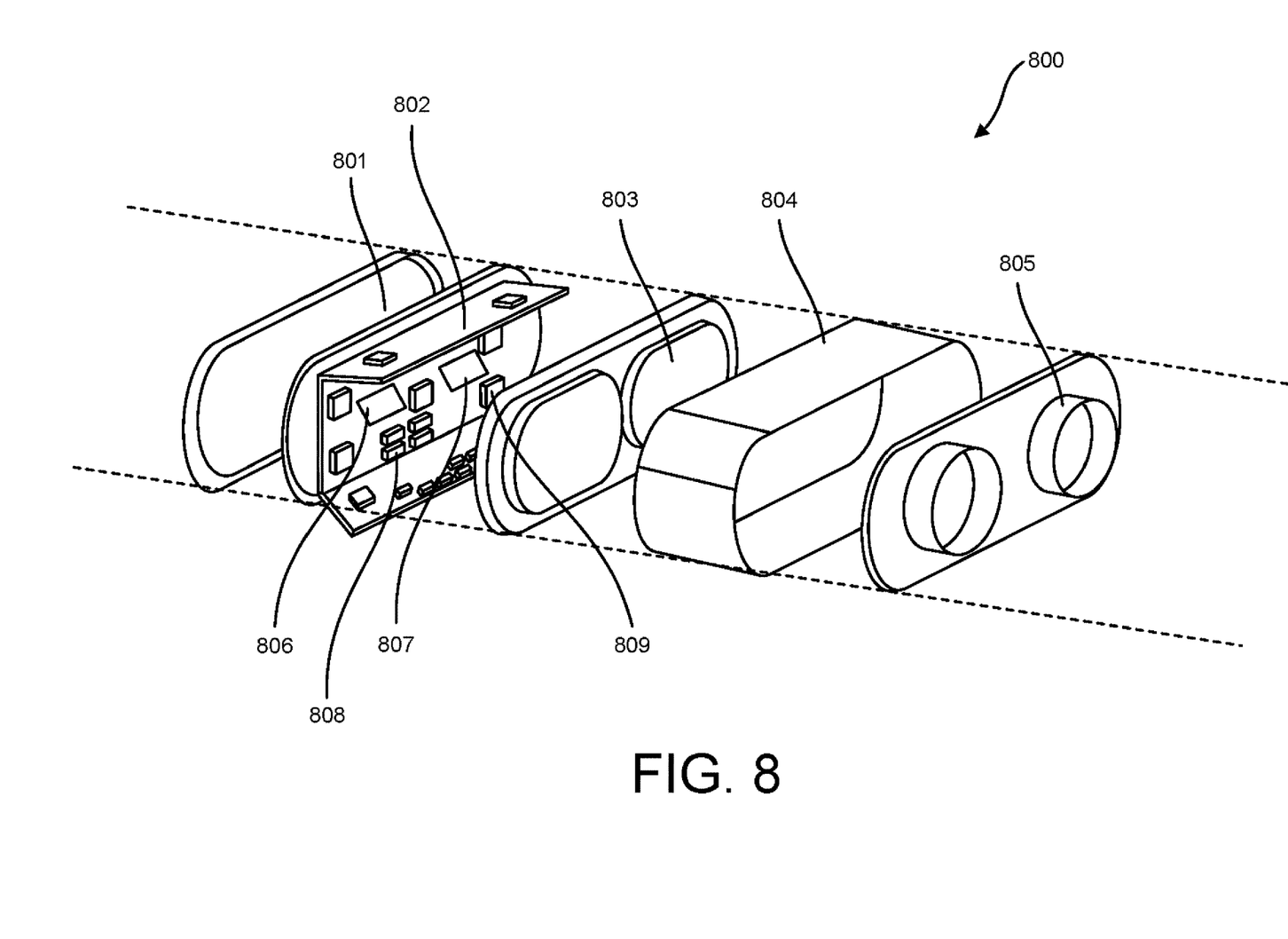
FIG. 8 is an exploded view of a client device, namely a headset according to one implementation of the present disclosure.

FIG. 8 is an exploded view of a client device, namely a headset 800 according to one implementation of the present disclosure. Headset 800 may include visual sensors 801, a circuit board 802 (which includes at least two receivers 806, 807), displays 803, and lenses 805. In addition, headset 800 contains a location detection device 808.

Location detection device 808 includes a sensor which can determine the location of the client device and the distance between receivers 806, 807 from one or more transmitters which transmitted the video data.

The location detection device 808 emits a signal when the distance between receiver 806 or receiver 807 is beyond a threshold distance from one or more transmitters in an external device (e.g., gaming console). In one implementation, location detection device 808 includes a sensor. In some implementations, location detection device 808 includes a sensor and a transmitter device. In one implementation, headset 800 includes an aggregator device communicatively coupled to the first receiver 806 and the second receiver 807 to supplement a received video data stream with data from the first set of video data or from the second set of video data in response to a data drop. The aggregator may be equipped with a timer that determines the time elapsed that the missing frame has been missing. If the missing frame has been missing for a threshold time period, the aggregator supplements the video stream with the low-resolution data.

It should be understood by one having ordinary skill in the art that the present disclosure is not limited to a system which the client device is only equipped with a location detection device. In one implementation, the host device is equipped with a location detection device and can both transmit location information and adjust the amount of data transmitted to the client device. In yet other implementations, both the host and client devices include complementary location detection devices which can communicate with each other regarding the respective locations and distance of the complimentary device.

Figure 9:
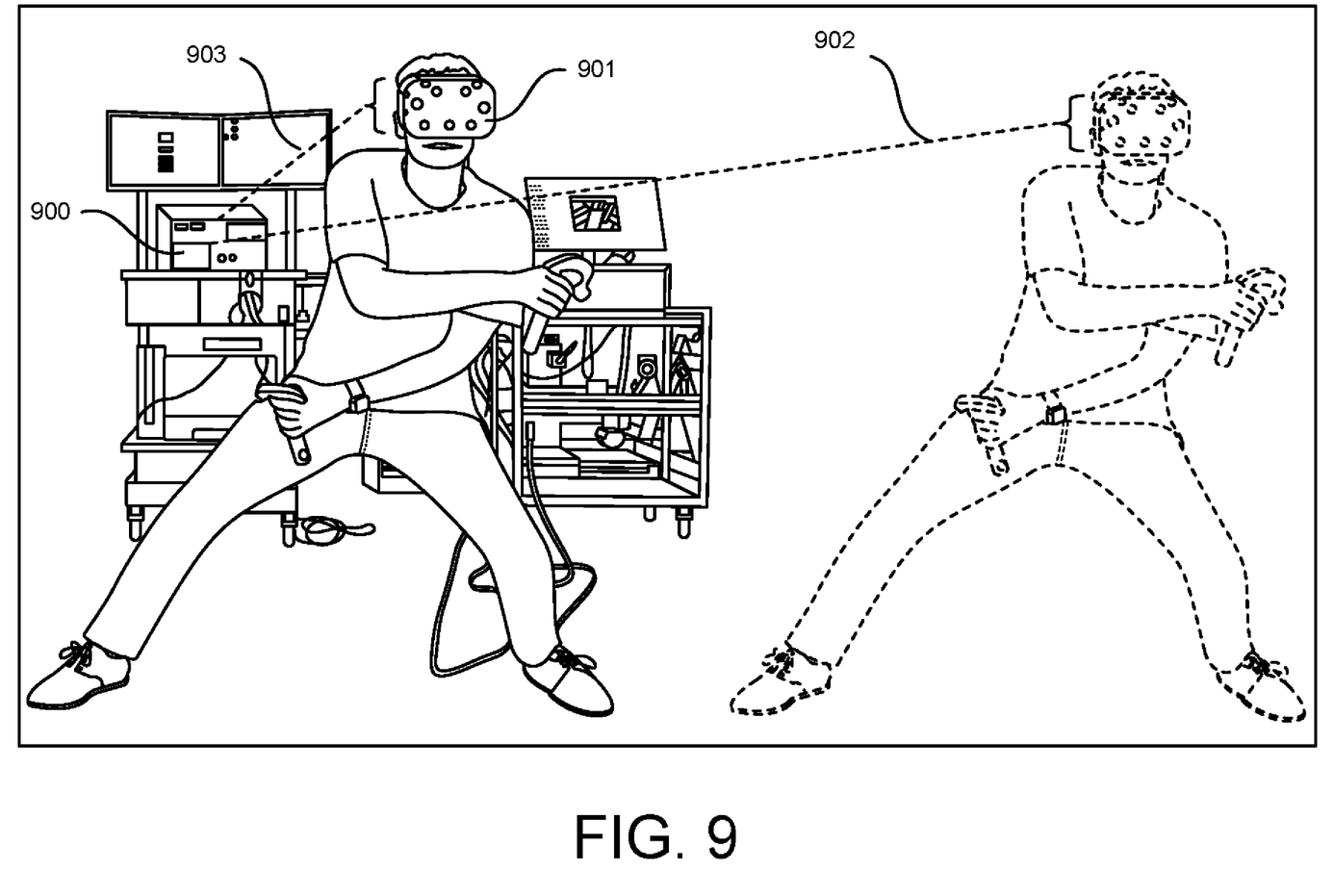
FIG. 9 is an illustration of a headset donned by a user that is various distances from a gaming console.

FIG. 9 is an illustration of a headset donned by a user that is various distances from a gaming console. Notably, the user is donning a headset client device 901 which is communicatively coupled to a gaming console 900. The headset 901 may transmit signals to the gaming console 900 when a distance therebetween exceeds a pre-determined threshold. The headset 901 may emit a signal such that the user is informed when the threshold is exceeded. For example, as shown in the figure, when the user moves, the distance of the headset increases from distance 903 to distance 902. If distance 902 exceeds a set threshold, headset 901 readily emits a signal to inform the user so that the user can move closer to the gaming console 900.

The employment of 60 GHz mmWave network channels may exhibit significant changes in network performance when the distance between the host and client devices vary. For example, when a 60 GHz mmWave communications protocol is used for augmented reality (A/R) or virtual reality (V/R) applications, the channel bandwidth capacity may dynamically change depending upon the head movement of the client device which translates to variances in distances from the host device. Accordingly, enabling the client device to alert users when the client device has exceeded or is approaching a threshold distance can prevent significant quality degradation. Furthermore, in addition to detecting the distance between the host and client devices, either of these devices may be equipped with a signal strength detection unit that monitors the wireless signal strength of each device. If the signal strength is below a pre-determined threshold or is trending thereto, the host or client device can issue an alert.

Figure 10:
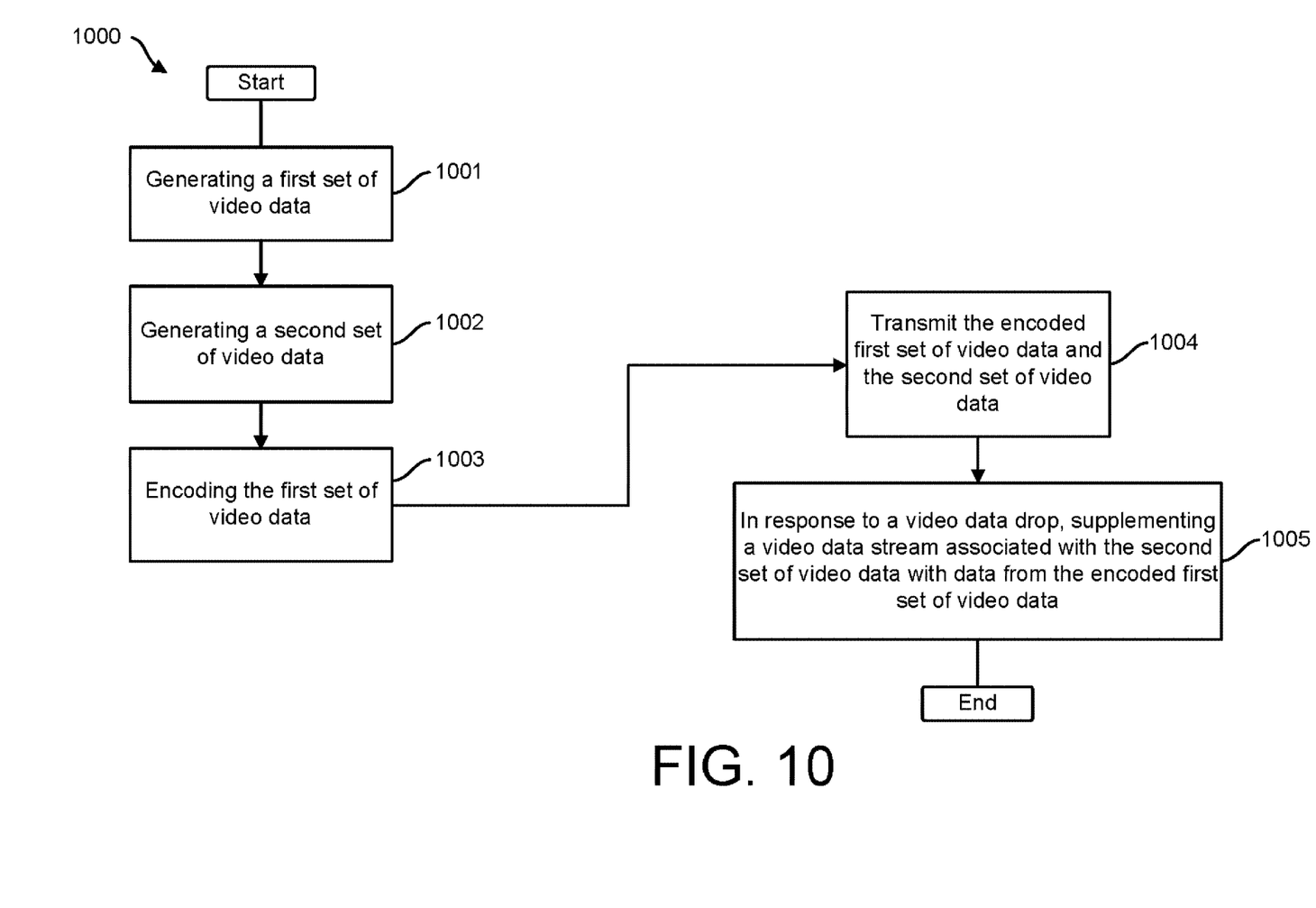
FIG. 10 is a flowchart of an example method of employing the present disclosure.

FIG. 10 is a flowchart 1000 of an example method of employing the present disclosure. Flowchart 1000 begins with generating a first set of video data along a first network channel (block 1001). After generating the first set of video data, encoding the first set of video data by dividing video frames associated with the first set of video data into blocks of pixels in a manner described in this disclosure. Additionally, generating a second set of video data along a second network channel (block 1002). The second set of video data may be a higher resolution version of the first set of video data.

Further, encoding color data associated with the first set of video data (block 1003). Encoding the color data may enable more data frames associated with the first set of video data to maximize the bandwidth of the first network channel. In one implementation, encoding the color data includes computing an average color value of each of the blocks of pixels, computing a difference of each color value associated with each pixel of a block with the average color value of the respective block of pixels, and storing each difference in color value associated with each pixel within a data frame.

Additionally, transmitting the encoded first set of video data and the second set of video data. Further, in response to a video data drop associated with the second set of data (on the client device side), supplementing the data stream with data from the encoded first set of video data (block 1005). In some implementations, the encoded first set of video data may be used, in part, as a back-up stream of data to supplement the video data stream associated with the second set of video data in the event of a data drop.

In some implementations, both the first encoded set of video data and the second set of video data are transmitted simultaneously along two respective dedicated transmitter devices. However, when the first encoded set of video data is transmitted in response to a data drop, the aforementioned sets of video data may be sent by the same or different transmitter devices.

As will be appreciated by one skilled in the art, the present disclosure may be embodied as a system, method or computer program product. Accordingly, the present disclosure may take the form of an entirely hardware implementation, a software implementation (including firmware, resident software, micro-code, etc.) stored in a storage device, or an implementation combining software and hardware aspects that may all generally be referred to herein as a "circuit," "module," or "system." Furthermore, the present disclosure may take the form of a computer program product embodied in any storage device having computer readable program code embodied in the medium. A storage device for storing computer readable program code does not encompass a signal propagation media such as copper cable, optical fiber or wireless transmission media.

Any combination of one or more computer-readable storage device may be utilized. The computer-readable storage device may be, for example but not limited to, an electronic, magnetic, optical, electromagnetic, infrared, or semiconductor system, apparatus, or device. More specific examples (a non-exhaustive list) of the computer-readable storage device may include the following: a portable computer diskette, a hard disk, a random access memory (RAM), a read-only memory (ROM), an erasable programmable read-only memory (EPROM or flash memory), a portable compact disc read-only memory (CDROM), an optical storage device, or a magnetic storage device processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java™, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer along any type of network, including a local area network (LAN) or a wide area network (WAN), or the connection may be made to an external computer (for example, via the Internet using an Internet Service Provider).

The present disclosure is described below with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The processor includes an arithmetic logic unit, a microprocessor, a general purpose controller or some other processor array to perform computations and provide electronic display signals to a display device. Processor processes data signals and may include various computing architectures including a complex instruction set computer (CISC) architecture, a reduced instruction set computer (RISC) architecture, or an architecture implementing a combination of instruction sets. The present disclosure includes a single processor, multiple processors may be included. Other processors, operating systems, sensors, displays and physical configurations are possible. In some implementations, the processor includes a networking processor core that is capable of processing network data traffic.

The memory stores instructions and/or data that may be executed by the processor. The instructions and/or data may include code for performing the techniques described herein. The memory may be a dynamic random access memory (DRAM) device, a static random access memory (SRAM) device, flash memory or some other memory device. In some implementations, the memory also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The computer program instructions may also be loaded onto a computer or other programmable data processing apparatus, such as but not limited to an expansion card such as a computer expansion card (e.g., memory expansion card or personal computer card) to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the foregoing description, for the purposes of illustration, methods were described in a particular order. It should be appreciated that in alternate implementations, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present disclosure. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

In the foregoing specification, a detailed description has been given with reference to specific example implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A non-transitory computer readable medium including instructions stored in memory when executed by a processor causes a computer to:
   generate a first set of video data;
   encode the first set of video data to obtain an encoded first set of video data at least in part by:
      dividing a video frame of the first set of video data into a plurality of pixel blocks;
      storing a set of color values for a set of pixels in a first pixel block of the plurality of pixel blocks, wherein each color value includes a luminance component value and one or more chrominance component values, and wherein storing the set of color values comprises encoding a single chrominance component value for both a first pixel and a second pixel adjacent to the first pixel in the first pixel block;
      computing an average color value of the first pixel block;
      computing a difference between a particular color value associated with a particular pixel in the first pixel block and the average color value;
      determining that the difference exceeds a threshold value; and
      assigning a maximum color value to the particular pixel such that a maximum number of bit values available to represent the difference is not exceeded;
   generate a second set of video data, the second set of video data being a higher resolution version of the first set of video data;
   transmit the second set of video data; and
   responsive to a data drop of the second set of video data transmission transmit the encoded first set of video data.

2. The non-transitory computer readable medium of claim 1, wherein the first pixel block comprises a 4×4 block of sixteen pixels.

3. The non-transitory computer readable medium of claim 2, wherein to encode the first set of video data further comprises instructions stored in the memory which when executed by the processor causes the computer to compute a difference of each color value associated with each pixel of the first block with the average color value of the first pixel block, and to store each difference of the color value associated with each pixel of the first pixel block.

4. The non-transitory computer readable medium of claim 3, wherein each computed difference of color value is stored as three bits of data.

5. The non-transitory computer readable medium of claim 4, wherein each pixel within the first pixel block comprises a respective color value which is within one standard deviation of the color values associated with the other pixels within the first pixel block.

6. The non-transitory computer readable medium of claim 3, wherein each data frame associated with each pixel in the first pixel block comprises eight bits of data, the eight bits of data comprises three bits of data for the computed color difference of the luminance component value, one bit of data for a sign of the computed color difference of the luminance component value, two bits of data for a first chrominance component value of the pixel, and two bits of data for a second chrominance component value of the pixel.

7. The non-transitory computer readable medium of claim 3 further comprising instructions stored in the memory which when executed by the processor causes the machine to transmit the encoded first set of video data along a first network channel and to transmit the second set of video data along a second network channel.

8. The non-transitory computer readable medium of claim 3, wherein the color value is a luminance color value.

9. The non-transitory computer readable medium of claim 7, wherein the first network channel is a 5 GHz Wi-Fi network channel and the second network channel is a 60 GHz mmWave network channel.

10. The non-transitory computer readable medium of claim 1, wherein the encoded first set of data comprises compressed data and the second data comprises uncompressed data.

11. A client device comprising:
   a first receiver to receive a first set of encoded video data along a first network channel, wherein the first set of encoded video data comprises a first video frame divided into a plurality of pixel blocks, wherein the first set of encoded video data is encoded at least in part by:
      storing a set of color values for a set of pixels in a first pixel block of the plurality of pixel blocks, wherein each color value includes a luminance component value and one or more chrominance component values, and wherein storing the set of color values comprises encoding a single chrominance component value for both a first pixel and a second pixel adjacent to the first pixel in the first pixel block;
      computing an average color value of the first pixel block;
      computing a difference between a particular color value associated with a particular pixel in the first pixel block and the average color value;
      determining that the difference exceeds a threshold value; and
      assigning a maximum color value to the particular pixel such that a maximum number of bit values available to represent the difference is not exceeded;
   a second receiver to receive a second set of video data along a second network channel, the second set of video data being a higher resolution version of the first set of video data; and
   an aggregator communicatively coupled to the first receiver and the second receiver to supplement a video data stream associated with the second set of data with data from the first set of encoded video data in response to a data drop associated with the video data stream.

12. The client device of claim, 11 further comprising:
   a location detection device to determine a distance between the first receiver and the second receiver from one or more transmitters which transmitted the first set of encoded video and the second set of video data.

13. The client device of claim 12, wherein the location detection device is to emit a signal to a host device when the distance between the first receiver or the second receiver is beyond a threshold distance from the one or more transmitters.

14. The client device of claim 12, wherein the location detection device is to send the distance information and a request to adjust an amount of data transmitted along the first network channel.

15. The client device of claim 12, wherein the aggregator is equipped with a timer that determines an elapsed time that a missing frame has not been received by the second receiver.

16. A system comprising:
a host device comprising:
 a first transmitter to transmit encoded video data; and
 a second transmitter to transmit raw video data, the raw video data being a higher resolution version of the encoded video data,
 wherein the encoded video data comprises a first video frame divided into a plurality of pixel blocks, and wherein the encoded video data is encoded at least in part by:
  storing a set of color values for a set of pixels in a first pixel block of the plurality of pixel blocks, wherein each color value includes a luminance component value and one or more chrominance component values, and wherein storing the set of color values comprises encoding a single chrominance component value for both a first pixel and a second pixel adjacent to the first pixel in the first pixel block;
  computing an average color value of the first pixel block;
  computing a difference between a particular color value associated with a particular pixel in the first pixel block and the average color value;
  determining that the difference exceeds a threshold value; and
  assigning a maximum color value to the particular pixel such that a maximum number of bit values available to represent the difference is not exceeded; and
a client device communicatively coupled to the host device, the client device, comprising:
 a first receiver to receive the encoded video data; and
 a second receiver to receive the raw video data; and
 an aggregator device communicatively coupled to the first receiver and the second receiver of the client device to supplement a video data stream containing the raw video data with data from the encoded video data in response to a data drop associated with the video data stream.

17. The system of claim 16, wherein the host device is a gaming console and the client device is a headset.

18. The system of claim 16, wherein the first receiver device is to detect the data drop.

* * * * *